C. H. HOWARD & H. M. PFLAGER.
SIX-WHEEL CAR TRUCK.
APPLICATION FILED APR. 11, 1914.
1,118,903.
Patented Nov. 24, 1914.
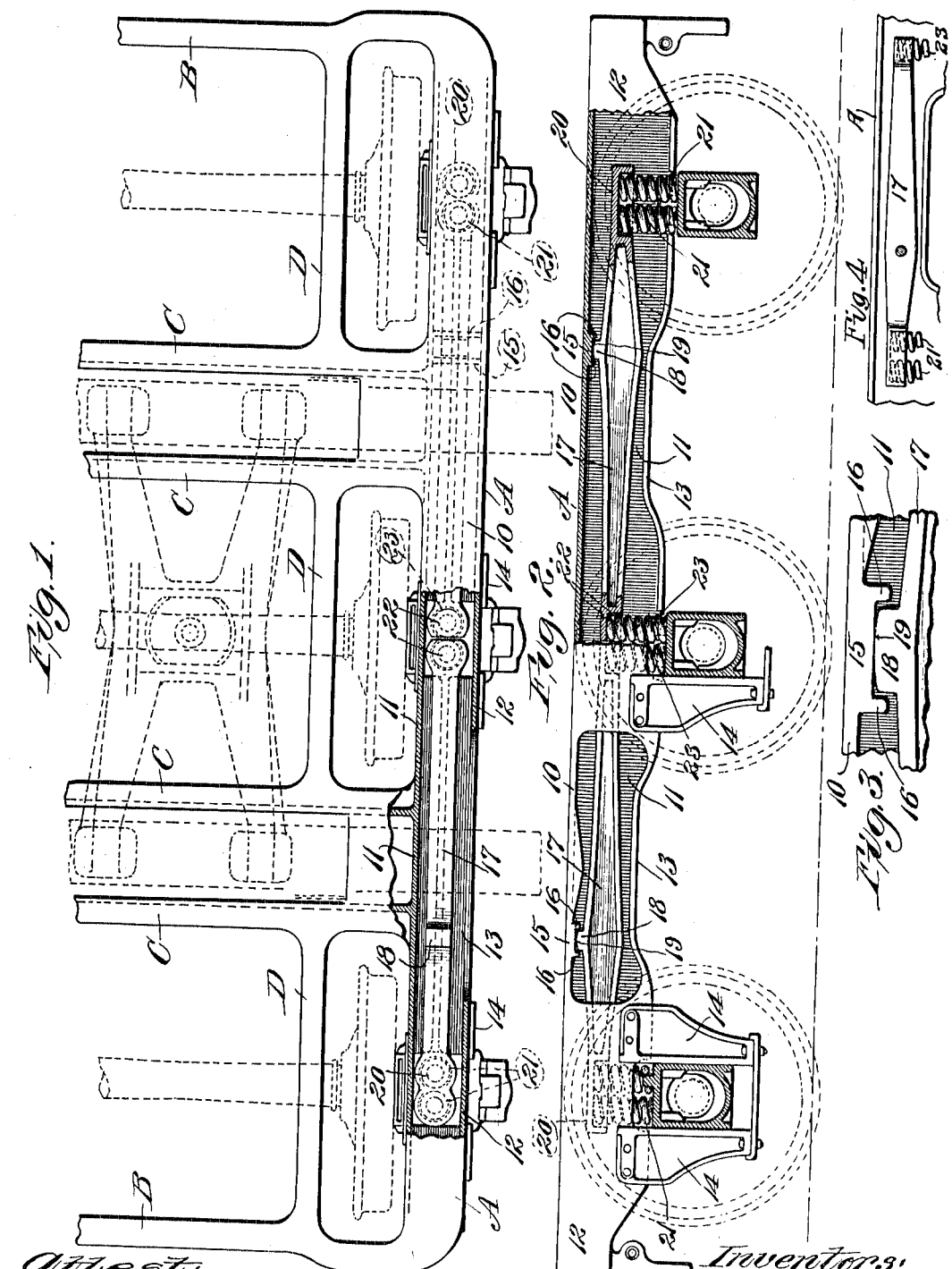

UNITED STATES PATENT OFFICE.

CLARENCE H. HOWARD AND HARRY M. PFLAGER, OF ST. LOUIS, MISSOURI, ASSIGNORS, BY MESNE ASSIGNMENTS, TO COMMONWEALTH STEEL COMPANY, A CORPORATION OF NEW JERSEY.

SIX-WHEEL CAR-TRUCK.

1,118,903.  Specification of Letters Patent.  Patented Nov. 24, 1914.

Application filed April 11, 1914. Serial No. 831,144.

*To all whom it may concern:*

Be it known that we, CLARENCE H. HOWARD and HARRY M. PFLAGER, citizens of the United States, residing at city of St. Louis, State of Missouri, have invented a certain new and useful Improvement in Six-Wheel Car-Trucks, of which the following is a full, clear, and exact description, such as will enable others skilled in the art to which it appertains to make and use the same, reference being had to the accompanying drawings, forming part of this specification, in which—

Figure 1 is a plan view of a portion of a six wheel truck frame, the wheel piece of which is partially broken away in order to show our improved construction of equalizing members. Fig. 2 is a side elevational view of the truck frame with a portion of the wheel piece in vertical section in order to more clearly illustrate one of the equalizing members and its connection with said wheel piece and the journal boxes. Fig. 3 is an enlarged elevational view of a portion of the truck frame and a portion of one of the equalizing members and showing the shifting or self-adjusting fulcrum. Fig. 4 is a detail view illustrating a modified form of the equalizing member forming a part of our improved truck.

Our invention relates generally to railway truck construction, and more particularly to the construction of the truck frame wheel pieces and the arrangement of the equalizing members with respect to the truck frame, our present invention being an improvement upon the construction covered by Patent No. 1,080,555, granted December 9, 1913. In the above mentioned patent a series of semielliptic springs are arranged within the hollow wheel piece of the truck frame, said springs bearing upon the journal boxes and the adjacent ends of said springs coöperating with equalizing members, which latter are fulcrumed at predetermined points on the upper portion of the wheel piece, and as distinguished from this construction our present invention contemplates a pair of equalizing members having movable and automatically adjustable fulcrums on the upper portion of the wheel piece, and coil springs arranged between the end portions of said equalizing members and the journal boxes.

The principal objects of our invention are to arrange the equalizing members and the coil springs within the hollow wheel pieces of the truck frame, and further to provide for the equalizing members automatically adjustable fulcrums by virtue of which construction the fulcrum of each equalizing member changes its position with respect to the ends of said member so that said fulcrum gradually moves toward the raised end of the member and moves away from the lowered end, thus shortening the distance between said fulcrum and the raised end, and correspondingly increasing the distance between the fulcrum and the lowered end, which action gives the lowered end the advantage in power, and consequently compensating for added deflection of the weakened spring, which would tend to lower one end of said equalizing member.

With the above and other objects in view, our invention consists in certain novel features of construction and arrangement of parts, hereinafter more fully described and claimed.

The truck frame shown in the accompanying drawings is of an accepted six wheel type, the same being cast integral, and comprising substantially hollow or tubular wheel pieces A, end rails B, transoms C, and wheel pieces D. The wheel piece as shown is substantially box-shape in cross section and comprises a top plate 10, inner wall 11, outer wall 12, and bottom plate 13. The outer wall 12 is preferably cut away at suitable points to permit the ready insertion or removal of the equalizing members and springs, and the bottom plate 13 is cut away between the pedestals 14 for the accommodation of the upper portion of the journal boxes and the springs resting thereupon. Formed integral with or fixed to the underside of the top plate 10 at suitable points are bearing blocks 15, the undersides of which are preferably flat and arranged at the ends of these bearing blocks are short depending lugs 16.

Positioned within the wheel pieces are the equalizing members, each comprising a bar 17 provided on its upper side with a lug 18, and the top face of this lug is curved lengthwise as designated by 19, and said curved face bears upon the under face of the corresponding block 15. The outer end of each bar is provided with an elongated spring seat 20 which receives the upper ends of one or more comparatively stiff coil springs 21, the lower ends of which rest upon the corresponding journal boxes. The inner end of each equalizing member is provided with a spring seat 22, which rests upon a corresponding coil spring 23, the same being mounted upon the central journal box.

Our improved construction provides a flexible and universal equalization between the different pairs of wheels by virtue of the pivotal engagement of the truck frame with the equalizing bars, and where any one of the wheels is raised or lowered relative to the others, the corresponding equalizing bar will be rocked upon its fulcrum so as to maintain a proper distribution of the weight upon all of the wheels. During the movement of any one of the fulcrum bars 17, the curved bearing face 19 rocks upon the corresponding bearing block 15, thus shifting the position or point of fulcrum relative to the ends of the equalizing members so that the distance between the fulcrum and the raised end of the bar is materially shortened, and likewise increasing the distance between the fulcrum and the lowered end of the equalizing member. This action necessarily gives the lowered end of the equalizer the advantage in power and the change of position of the fulcrum point is gradual and in proportion to the movement of the equalizer. By thus increasing the flexibility of the truck, the ready movement of the car is made more easy and gentle, and by arranging the equalizing members within the hollow wheel pieces, the entire lower portion of the truck is free and open to inspection or repairs.

In the modification illustrated in Fig. 4, an equalizing member which is provided on its ends with spring seats has a fixed point of pivotal connection with the wheel piece of the truck frame. This construction will be found advantageous in certain forms of trucks.

It will be readily understood that minor changes in the size, form and construction of the various parts of our improved truck frame can be made and substituted for those herein shown and described, without departing from the spirit of our invention, the scope of which is set forth in the appended claims.

We claim:

1. The combination with a truck frame, and its journal boxes, of an equalizing member having a shiftable fulcrum on the truck frame, and springs interposed between the ends of said member and the journal boxes.

2. The combination with a truck frame and its journal boxes, of an equalizing member having an automatically adjustable fulcrum on the truck frame, and springs interposed between the ends of said member and the journal boxes.

3. In a car truck, a truck frame having substantially hollow wheel pieces, journal boxes beneath said wheel pieces, rigid equalizing members located in the wheel pieces, which members have shiftable fulcrums, the ends of which members terminate substantially above the journal boxes, and coil springs interposed between the ends of said members and said journal boxes.

4. In a car truck, the combination with a truck frame and journal boxes, of an equalizing member arranged between an adjacent pair of the journal boxes, coil springs interposed between the journal boxes and the ends of the equalizing members, and a lug on the equalizing member, which lug has a curved bearing face which engages a part of the truck frame.

5. In a truck, the combination with a truck frame and journal boxes, of a bearing formed on the truck frame, an equalizing member having a curved bearing face which engages the bearing on the frame, and springs interposed between the ends of the equalizing member and the journal boxes.

6. In a car truck, an equalizing member arranged between the truck frame and journal boxes, which member has a shiftable fulcrum on the truck frame and flexible members between the ends of the equalizing member and the journal boxes.

7. The combination with a truck frame, of an equalizing member having a shiftable fulcrum on said frame and springs supporting the ends of said equalizing member.

8. The combination with a car truck frame, of an equalizing member having a fulcrum on said frame, which fulcrum is automatically adjustable toward and away from the ends of said equalizing member during the vertical movement of said ends.

9. The combination with a car truck frame having a bearing face, of an equalizing member provided with a bearing face, which coöperates with the bearing face on the truck frame, one of which bearing faces is straight and the other bearing face being curved.

10. The combination with a car truck frame provided with a flat bearing face, of an equalizing member having a curved bearing face which engages the flat bearing face on the truck frame.

In testimony whereof we hereunto affix our signatures in the presence of two witnesses, this 6th day of April, 1914.

CLARENCE H. HOWARD.
HARRY M. PFLAGER.

Witnesses:
  HAL C. BELLVILLE,
  OTTO V. MYERS.